United States Patent
Erkelenz et al.

(10) Patent No.: US 9,296,893 B2
(45) Date of Patent: *Mar. 29, 2016

(54) ETHYLENE-PROPYLENE-MALEIC ACID ANHYDRIDE COPOLYMER AS IMPACT MODIFIER IN GLASS-FIBER REINFORCED, FLAME-RETARDANT POLYCARBONATES FOR THE EE SECTOR

(71) Applicant: Bayer Intellectual Property GmbH, Monheim (DE)

(72) Inventors: Michael Erkelenz, Duisburg (DE); Hans Franssen, Krefeld (DE); Helmut Werner Heuer, Leverkusen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/359,614

(22) PCT Filed: Nov. 30, 2012

(86) PCT No.: PCT/EP2012/074033
§ 371 (c)(1),
(2) Date: May 21, 2014

(87) PCT Pub. No.: WO2013/079634
PCT Pub. Date: Jun. 6, 2013

(65) Prior Publication Data
US 2014/0329948 A1    Nov. 6, 2014

(30) Foreign Application Priority Data
Nov. 30, 2011    (EP) ................................... 11191242

(51) Int. Cl.
| | |
|---|---|
| *C08L 69/00* | (2006.01) |
| *C08K 5/42* | (2006.01) |
| *C08K 7/14* | (2006.01) |
| *C08L 23/08* | (2006.01) |
| *C08K 5/103* | (2006.01) |

(52) U.S. Cl.
CPC ................. *C08L 69/00* (2013.01); *C08K 5/103* (2013.01); *C08K 5/42* (2013.01); *C08K 7/14* (2013.01); *C08L 23/0869* (2013.01); *C08L 2201/02* (2013.01); *C08L 2201/08* (2013.01)

(58) Field of Classification Search
CPC ....... C08L 69/00; C08L 23/0815; C08K 3/36; C08K 5/42
USPC ........................................................ 524/165
See application file for complete search history.

(56) References Cited

U.S. PATENT DOCUMENTS

| | | | |
|---|---|---|---|
| 2,991,273 A | 7/1961 | Hechelhammer et al. | |
| 2,999,825 A | 9/1961 | Floyd et al. | |
| 2,999,846 A | 9/1961 | Schnell et al. | |
| 3,028,635 A | 4/1962 | Herubel et al. | |
| 3,148,172 A | 9/1964 | Fox | |
| 3,271,367 A | 9/1966 | Schnell et al. | |
| 4,420,584 A | 12/1983 | Rawlings et al. | |
| 4,982,014 A | 1/1991 | Freitag et al. | |
| 5,288,778 A | 2/1994 | Schmitter et al. | |
| 5,783,620 A | 7/1998 | Hamashima et al. | |
| 5,883,165 A | 3/1999 | Kröhnke et al. | |
| 2005/0256227 A1 | 11/2005 | Miyamoto et al. | |
| 2010/0240818 A1* | 9/2010 | Walton et al. | 524/505 |
| 2013/0079443 A1* | 3/2013 | Taschner et al. | 524/127 |
| 2014/0243467 A1* | 8/2014 | Dern et al. | 524/508 |

FOREIGN PATENT DOCUMENTS

| | | |
|---|---|---|
| DE | 1570703 A | 2/1970 |
| DE | 2036052 A | 1/1972 |
| DE | 2063050 A | 7/1972 |
| DE | 2211956 A | 10/1973 |
| DE | 3832396 A | 2/1990 |
| EP | 0500496 A1 | 2/1992 |
| EP | 0839623 A | 5/1998 |
| FR | 1561518 A | 3/1969 |
| GB | 1122003 A | 7/1968 |
| GB | 1229482 A | 4/1971 |
| GB | 1341318 A | 12/1973 |
| GB | 1367790 A | 9/1974 |
| JP | 55157648 A | 12/1980 |
| JP | 62039/1986 A | 3/1986 |
| JP | 62040/1986 A | 3/1986 |
| JP | 105550/1986 A | 5/1986 |
| JP | 3212468 A | 7/1996 |
| WO | WO-96/15102 A2 | 5/1996 |

* cited by examiner

*Primary Examiner* — John Uselding
(74) *Attorney, Agent, or Firm* — Drinker Biddle & Reath LLP

(57) ABSTRACT

The present invention relates to flame-resistant, thermoplastic molding compositions containing at least one aromatic polycarbonate, at least one flameproofing agent, at least one rubber-free anhydride-modified alpha-olefin terpolymer, at least one glass fiber, at least one antidripping agent, and optionally, at least one mold release agent and/or further additives.

The present invention furthermore relates to the use of the compositions according to the invention for the production of thin-walled housing parts or switch boxes in the EE sector.

16 Claims, No Drawings

ETHYLENE-PROPYLENE-MALEIC ACID ANHYDRIDE COPOLYMER AS IMPACT MODIFIER IN GLASS-FIBER REINFORCED, FLAME-RETARDANT POLYCARBONATES FOR THE EE SECTOR

CROSS-REFERENCE TO RELATED APPLICATIONS

This application is a national stage application (under 35 U.S.C. §371) of PCT/EP2012/074033, filed Nov. 30, 2012, which claims benefit of European Application No. 11191242.4, filed Nov. 30, 2011, both of which are incorporated herein by reference in their entirety.

The present invention relates to impact-modified glass fibre-reinforced polycarbonate compositions of high rigidity and improved thermal and rheological properties in combination with good flameproofing properties. The present invention furthermore relates to the use of the compositions according to the invention for the production of thin-walled housing parts or switch boxes in the EE sector.

These moulding compositions are suitable in particular for components which meet fire protection classification UL94 V0 at a wall thickness of 1.0 mm.

JP3212468 discloses on the one hand non-flameproofed polycarbonate compositions of 45-97 wt. % of an aromatic polycarbonate resin with 3-55 wt. % of an inorganic filler (glass flakes, metal flakes, mica or talc) and 0.02-3 wt. % of an olefinic wax which comprises carboxyl groups or derivatives thereof. On the other hand, compositions which comprise 7-96 wt. % of an aromatic polycarbonate resin and 1-90 wt. % of an olefinic graft polymer with 3-55 wt. % of an inorganic filler (glass flakes, metal flakes, mica or talc) and 0.02-3 wt. % of the abovementioned olefinic wax are described.

The object of the present invention was thus to provide impact-modified glass fibre-reinforced polycarbonate compositions having a combination of high rigidity and toughness in axial and biaxial behaviour, good thermal and rheological properties and a flame resistance of UL94 V0 at 1.0 mm wall thickness which do not have the disadvantages of the compositions known from the prior art, in particular do not have the conventional loss of toughness caused by addition of glass fibres or the loss of flameproofing on addition of the necessary high amounts of an impact modifier.

It has now been found, surprisingly, that the abovementioned properties are obtained when a rubber-free anhydride-modified alpha-olefin terpolymer is employed as an impact modifier in polycarbonate compositions in combination with a specific flameproofing agent combination and with specific glass fibres.

The moulding compositions of such composition are distinguished by good mechanical properties and a good toughness and good rheological and thermal properties coupled with improved flame resistance.

The present invention provides flame-resistant, thermoplastic moulding compositions comprising A) 41.500 to 94.749 parts by wt., preferably 60.000 to 93.000 parts by wt., particularly preferably 74.000 to 92.500 parts by wt. of at least one aromatic polycarbonate, B) 0.001 to 1.000 part by wt., preferably 0.050 to 0.800 part by wt., further preferably 0.100 to 0.600 part by wt., particularly preferably 0.100 to 0.300 part by wt. of at least one flameproofing agent, C) 0.20 to 1.50 part by wt., preferably 0.20 to 1.00 part by wt., further preferably 0.25 to 0.90 part by wt., further preferably from 0.30 to 0.70 part by wt., particularly preferably from 0.40 to 0.60 part by wt. of at least one rubber-free anhydride-modified alpha-olefin terpolymer, D) 5.0 to 40.0 parts by wt., preferably 6.0 to 30.0 parts by wt., further preferably 7.0 to 20.0 parts by wt. of at least one glass fibre, E) 0.00 part by wt. to 1.00 part by wt., further preferably 0.10 part by wt. to 0.75 part by wt., particularly preferably 0.15 part by wt. to 0.60 part by wt., and very particularly preferably 0.20 to 0.50 part by wt. of at least one mould release agent, F) 0.05 wt. % to 5.00 wt. %, preferably 0.10 wt. % to 1.00 wt. %, particularly preferably 0.10 wt. % to 0.80 wt. % of at least one antidripping agent, calculated for pure PTFE, G) 0 to 10.00 parts by wt., preferably 0.10 to 8.00 parts by wt., particularly preferably 0.20 to 3.00 parts by wt. of further conventional additives, wherein the sum of the parts by weight of components A) to G) adds up to 100 parts by weight.

In a preferred embodiment, the composition consists of components A)-G).

In a preferred embodiment, the composition is free from mould release agents, and further preferably it comprises UV absorbers instead.

Preferred embodiments mentioned in the present invention can furthermore be combined with one another and are not to be regarded exclusively as an independent modification.

Component A)

Polycarbonates in the context of the present invention are both homopolycarbonates and copolycarbonates; the polycarbonates can be linear or branched in a known manner.

The preparation of the polycarbonates is carried out in a known manner from diphenols, carbonic acid derivatives, optionally chain terminators and branching agents.

Details of the preparation of polycarbonates have been laid down in many patent specifications for about 40 years. Reference may be made here by way of example to Schnell, "Chemistry and Physics of Polycarbonates", Polymer Reviews, volume 9, Interscience Publishers, New York, London, Sydney 1964, to D. Freitag, U. Grigo, P. R. Müller, H. Nouverné, BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Diphenols which are suitable for the preparation of the polycarbonates are, for example, hydroquinone, resorcinol, dihydroxydiphenyls, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl) sulfones, bis-(hydroxyphenyl) sulfoxides, alpha,alpha'-bis-(hydroxyphenyl)-diisopropylbenzenes, phthalimidines derived from derivatives of isatin or of phenolphthalein, and nucleus-alkylated, nucleus-arylated and nucleus-halogenated compounds thereof.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,1-bis-(3,5-dimethyl-4- hydroxyphenyl)-p-diisopropylbenzene, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and further suitable diphenols are described e.g. in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates, only one diphenol is employed, and in the case of copolycarbonates several diphenols are employed.

Suitable carbonic acid derivatives are, for example, phosgene or diphenyl carbonate.

Suitable chain terminators which can be employed in the preparation of the polycarbonates are both monophenols and monocarboxylic acids. Suitable monophenols are, for example, phenol itself, alkylphenols, such as cresols, p-tert-butylphenol, cumylphenol, p-n-octylphenol, p-iso-octylphenol, p-n-nonylphenol and p-iso-nonylphenol, halophenols, such as p-chlorophenol, 2,4-dichlorophenol, p-bromophenol and 2,4,6-tribromophenol, 2,4,6-triiodophenol, p-iodophenol, and mixtures thereof.

Preferred chain terminators are furthermore the phenols which are substituted once or several times by C1 to C30-alkyl radicals, linear or branched, preferably unsubstituted or substituted by tert-butyl. Particularly preferred chain terminators are phenol, cumylphenol and/or p-tert-butylphenol.

Suitable monocarboxylic acids are furthermore benzoic acid, alkylbenzoic acids and halobenzoic acids.

The amount of chain terminator to be employed is preferably 0.1 to 5 mol %, based on the moles of the particular diphenols employed. The chain terminators can be added before, during or after the reaction with a carbonic acid derivative.

Suitable branching agents are the tri- or more than trifunctional compounds known in polycarbonate chemistry, in particular those having three or more than three phenolic OH groups.

Suitable branching agents are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally to be employed is preferably 0.05 mol % to 2.00 mol %, based in turn on the moles of the particular diphenols employed.

The branching agents either can be initially introduced with the diphenols and the chain terminators in the aqueous alkaline phase, or can be added as a solution in an organic solvent before the phosgenation. In the case of the transesterification process, the branching agents are employed together with the diphenols.

The aromatic polycarbonates of the present invention have weight-average molecular weights Mw (determined by gel permeation chromatography and calibration with a polycarbonate standard) of between 5,000 and 200,000 g/mol, preferably between 18,000-36,000 g/mol, further preferably between 22,000-34,000 g/mol, still further preferably between 24,000-32,000 g/mol, and particularly preferably between 26,000-32,000 g/mol.

Particularly preferred polycarbonates are the homopolycarbonate based on bisphenol A, the homopolycarbonate based on 1,3-bis-(4-hydroxyphenyl)-3,3,5-trimethylcyclohexane and the copolycarbonates based on the two monomers bisphenol A and 1,1-bis-(4-hydroxyphenyl)-3,3,5-trimethylcyclohexane.

Component B)

Suitable flameproofing agents in the context of the present invention are, inter alia, alkali metal and alkaline earth metal salts of aliphatic or aromatic sulfonic acid, sulfonamide and sulfonimide derivatives, e.g. potassium perfluorobutane-sulfonate, potassium diphenyl sulfone-sulfonate, N-(p-tolylsulfonyl)-p-toluenesulfimide potassium salt and N—(N'-benzylaminocarbonyl)-sulfanylimide potassium salt.

Salts which can optionally be used in the moulding compositions according to the invention are, for example: sodium or potassium perfluorobutane-sulfate, sodium or potassium perfluoromethanesulfonate, sodium or potassium perfluorooctane-sulfate, sodium or potassium 2,5-dichlorobenzene-sulfate, sodium or potassium 2,4,5-trichlorobenzene-sulfate, sodium or potassium methyl-phosphonate, sodium or potassium (2-phenylethylene)-phosphonate, sodium or potassium pentachlorobenzoate, sodium or potassium 2,4,6-trichlorobenzoate, sodium or potassium 2,4-dichlorobenzoate, lithium phenyl-phosphonate, sodium or potassium diphenyl sulfone-sulfonate, sodium or potassium 2-formylbenzene-sulfonate, sodium or potassium (N-benzenesulfonyl)-benzenesulfonamide, trisodium or tripotassium hexafluoroaluminate, disodium or dipotassium hexafluorotitanate, disodium or dipotassium hexafluorosilicate, disodium or dipotassium hexafluorozirconate, sodium or potassium pyrophosphate, sodium or potassium metaphosphate, sodium or potassium tetrafluoroborate, sodium or potassium hexafluorophosphate, sodium or potassium or lithium phosphate, N-(p-tolylsulfonyl)-p-toluenesulfimide potassium salt and N—(N'-benzylaminocarbonyl)-sulfanylimide potassium salt.

Sodium or potassium perfluorobutane-sulfate, sodium or potassium perfluorooctane-sulfate, sodium or potassium diphenyl sulfone-sulfonate and sodium or potassium 2,4,6-trichlorobenzoate, N-(p-tolylsulfonyl)-p-toluenesulfimide potassium salt and N—(N'-benzylaminocarbonyl)-sulfanylimide potassium salt are preferred. Potassium nonafluoro-1-butanesulfonate and sodium or potassium diphenyl sulfone-sulfonate are very particularly preferred. Potassium nonafluoro-1-butanesulfonate is commercially obtainable inter alia as Bayowet® C4 (Lanxess, Leverkusen, Germany, CAS no. 29420-49-3), RM64 (Miteni, Italy) or as 3M™ Perfluorobutanesulfonyl Fluoride FC-51 (3M, USA). Mixtures of the salts mentioned are likewise suitable. Potassium nonafluoro-1-butanesulfonate is particularly preferably employed.

Component C)

Component C in the context of the present invention is a rubber-free anhydride-modified alpha-olefin terpolymer, wherein the anhydride is an unsaturated carboxylic acid anhydride.

The anhydride is preferably chosen from the group which includes maleic anhydride, phthalic anhydride, fumaric anhydride and itaconic anhydride and mixtures thereof.

The anhydride is particularly preferably maleic anhydride.

The alpha-olefin terpolymer preferably comprises units chosen from the group which consists of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene and mixtures of these.

The terpolymer particularly preferably comprises ethylene, 1-propene and 1-octene as units.

The rubber-free anhydride-modified terpolymer is characterized in that the composition comprises C1) 90.0-98.0 wt. %, preferably 92.0-97.5 wt. %, particularly preferably 94.0-97.0 wt. % of terpolymer and C2) 2.0-10.0 wt. %, preferably 2.5-8.0 wt. %, and particularly preferably 3.0-6.0 wt. % of anhydride.

The rubber-free anhydride-modified terpolymer preferably has a molecular weight Mw of 2,000-10,000 g/mol, preferably 2,500-8,000 g/mol, particularly preferably 3,000-6,000 g/mol, determined by GPC (gel permeation chromatography) in trichlorobenzene as the solvent with polystyrene as the standard.

The olefinic part C1) of the anhydride-modified terpolymer is preferably characterized in that the ethylene content is 96.0-80.0 wt. %, further preferably 92.0-84.0 wt. %;

the propylene content is 2.0-10.0 wt. %, further preferably 4.0-8.0 wt. %; and the octene content is 2.0-10.0 wt. %, further preferably 4.0-8.0 wt. %.

Component D)

Fillers in the context of the present invention are glass fibres.

Preferably, cut glass fibres which are produced from M-, E-, A-, S-, R- or C-glass are used, E- or C-glass being further preferred.

The diameter of the fibres is preferably 5 to 25 µm, further preferably 6 to 20 µm, particularly preferably 7 to 17 µm.

The cut glass fibres preferably have a length before the compounding of from 3 mm to 6 mm.

The glass fibres used are distinguished in that the choice of the fibres is not limited by the interaction characteristics of the fibres with the polycarbonate matrix.

An improvement in the properties according to the invention of the compositions is shown both for a strong binding to the polymer matrix and in the case of a non-binding fibre.

A strong binding of the glass fibres to the polymer matrix is to be seen from the low temperature fracture surfaces in scanning electron microscopy photographs, the highest number of broken glass fibres being broken at the same level as the matrix and only isolated glass fibres protruding out of the matrix. For the converse case of non-binding characteristics, scanning electron microscopy photographs show that under low temperature fracture the glass fibres protrude markedly from the matrix or have slid out completely.

Component E)

The mould release agents E) used are esters of aliphatic long-chain carboxylic acids with mono- or polyfunctional aliphatic and/or aromatic hydroxy compounds. Aliphatic carboxylic acid esters which are particularly preferably used are compounds of the general formula (III):

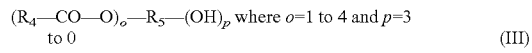

$$(R_4{-}CO{-}O)_o{-}R_5{-}(OH)_p \text{ where } o=1 \text{ to } 4 \text{ and } p=3 \text{ to } 0 \qquad (III)$$

wherein $R_4$ is an aliphatic saturated or unsaturated, linear, cyclic or branched alkyl radical and $R_5$ is an alkylene radical of a 1- to 4-functional aliphatic alcohol $R_5{-}(OH)_{o+p}$.

C1-C18 alkyl radicals are particularly preferred for $R_4$. C1-C18-alkyl represents, for example, methyl, ethyl, n-propyl, iso-propyl, n-butyl, sec-butyl, tert-butyl, n-pentyl, 1-methylbutyl, 2-methylbutyl, 3-methylbutyl, neopentyl, 1-ethylpropyl, cyclohexyl, cyclopentyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl or 1-ethyl-2-methylpropyl, n-heptyl and n-Octyl, pinacyl, Adamantyl, the isomeric menthyls, n-nonyl, n-decyl, n-dodecyl, n-tridecyl, n-tetradecyl, n-hexadecyl or n-octadecyl.

Alkylene represents a straight-chain, cyclic, branched or unbranched C1-C18 alkylene radical. C1-C18-alkylene represents, for example, methylene, ethylene, n-propylene, iso-propylene, n-butylene, n-pentylene, n-hexylene, n-heptylene, n-octylene, n-nonylene, n-decylene, n-dodecylene, n-tridecylene, n-tetradecylene, n-hexadecylene or n-octadecylene.

Free, non-esterified OH groups can also be present in esters of polyfunctional alcohols. Aliphatic carboxylic acid esters which are suitable according to the invention are e.g.: glycerol monostearate, palmityl palmitate and stearyl stearate. Mixtures of various carboxylic acid esters of the formula (III) can also be employed. Carboxylic acid esters which are preferably used are esters of pentaerythritol, glycerol, trimethylolpropane, propanediol, stearyl alcohol, cetyl alcohol or myristyl alcohol with myristic, palmitic, stearic or montanic acid and mixtures thereof. Pentaerythritol tetrastearate, stearyl stearate and propanediol distearate or mixtures thereof are particularly preferred and pentaerythritol tetrastearate is most preferred.

Polytetrafluoroethylene (PTFE) can additionally be added to the moulding compositions as the antidripping agent of component (F). This is commercially available in various product qualities. These include additives such as Hostaflon® TF2021 or PTFE blends, such as Metablen® A-3800 (approx. 40% PTFE CAS 9002-84-0 and approx. 60% methyl methacrylate/butyl acrylate copolymer CAS 25852-37-3 from Misubishi-Rayon) or Blendex® B449 (approx. 50% PTFE and approx. 50% SAN [of 80% styrene and 20% acrylonitrile]) from Chemtura. Blendex® B449 is preferably used.

Specific UV stabilizers which have the lowest possible transmission below 400 nm and the highest possible transmission above 400 nm can optionally be added to the compositions as a further additive (G). Ultraviolet absorbers which are particularly suitable for use in the composition according to the invention are benzotriazoles, triazines, benzophenones and/or arylated cyanoacrylates.

Particularly suitable ultraviolet absorbers are hydroxybenzotriazoles, such as 2-(3',5'-bis-(1,1-dimethylbenzyl)-2'-hydroxyphenyl)-benzotriazole (Tinuvin® 234, BASF, Ludwigshafen), 2-(2'-hydroxy-5'-(tert-octyl)-phenyl)-benzotriazole (Tinuvin® 329, BASF, Ludwigshafen), 2-(2'-hydroxy-3'-(2-butyl)-5'-(tert-butyl)-phenyl)-benzotriazole (Tinuvin® 350, BASF, Ludwigshafen), bis-(3-(2H-benzotriazolyl)-2-hydroxy-5-tert-octyl)methane, (Tinuvin® 360, BASF, Ludwigshafen), (2-(4,6-diphenyl-1,3,5-triazin-2-yl)-

5-(hexyloxy)-phenol (Tinuvin® 1577, BASF, Ludwigshafen), and the benzophenones 2,4-dihydroxybenzophenone (Chimassorb® 22, BASF, Ludwigshafen) and 2-hydroxy-4-(octyloxy)-benzophenone (Chimassorb® 81, BASF, Ludwigshafen), 2-propenoic acid, 2-cyano-3,3-diphenyl-, 2,2-bis[[(2-cyano-1-oxo-3,3-diphenyl-2-propenyl)oxy]-methyl]-1,3-propanediyl ester (9CI) (Uvinul® 3030, BASF AG Ludwigshafen), 2-[2-hydroxy-4-(2-ethylhexyl)oxy]phenyl-4,6-di(4-phenyl)phenyl-1,3,5-triazine (CGX UVA 006, BASF, Ludwigshafen), tetraethyl 2,2'-(1,4-phenylenedimethylidene)-bismalonate (Hostavin® B-Cap, Clariant AG) or N-(2-ethoxyphenyl)-N'-(2-ethylphenyl)-ethanediamide (Tinuvin® 312, CAS no. 23949-66-8, BASF, Ludwigshafen).

Particularly preferred specific UV stabilizers are, for example, Tinuvin® 360, Tinuvin® 329 and Tinuvin® 312, particularly preferably TIN 329 and Tinuvin® 312.

Mixtures of these ultraviolet absorbers can also be employed.

According to a specific embodiment of the invention, the composition comprises ultraviolet absorbers in an amount of from 0 ppm to 6,000 ppm, preferably 500 ppm to 5,000 ppm, and further preferably 1,000 ppm to 2,000 ppm, based on the total composition.

In addition to the stabilizers according to the invention, the polymer compositions according to the invention can optionally also comprise further conventional polymer additives as component G), such as e.g. the antioxidants, heat stabilizers, flameproofing agents which differ from B), optical brighteners and light-scattering agents described in EP-A 0 839 623, WO-A 96/15102, EP-A 0 500 496 or "Plastics Additives Handbook", Hans Zweifel, 5th edition 2000, Hanser Verlag, Munich), in the conventional amounts for the particular thermoplastics.

The polymer compositions according to the invention can furthermore comprise pigments and/or dyestuffs in the conventional amounts as component G).

Compounds which are preferably suitable as heat stabilizers according to component (G) are triphenylphosphine, tris-(2,4-di-tert-butylphenyl) phosphite (Irgafos 168), tetrakis-(2,4-di-tert-butylphenyl)-[1,1-biphenyl]-4,4'-diyl-bisphosphonite, trisoctyl phosphate, octadecyl 3-(3,5-di-tert-butyl-4-hydroxyphenyl)-propionate (Irganox 1076), bis-(2,4-dicumylphenyl)-pentaerythritol diphosphite (Doverphos S-9228) and bis-(2,6-di-tert-butyl-4-methylphenyl)-pentaerythritol diphosphite (ADK STAB PEP-36). They are employed by themselves or in a mixture (e.g. Irganox B900 (mixture of Irganox 168 and Irganox 1076 in the ratio of 1:3) or Doverphos S-92228 with Irganox B900 or Irganox 1076).

The preparation of the polymer compositions according to the invention comprising components A) to G) is carried out with the usual processes of incorporation by bringing together, mixing and homogenizing the individual constituents, the homogenizing in particular preferably taking place in the melt under the action of shearing forces. The bringing together and mixing are optionally carried out before the melt homogenization, using powder premixes.

Premixes of granules or granules and powders with the additives according to the invention can also be used.

Premixes which have been prepared from solutions of the mixing components in suitable solvents, homogenization optionally being carried out in solution and the solvent then being removed, can also be used.

In particular, the additives of the composition according to the invention can be introduced here by known processes or as a masterbatch.

The use of masterbatches is preferred in particular for introduction of the additives, masterbatches based on the particular polymer matrix being used in particular.

In this connection, the composition can be brought together, mixed, homogenized and then extruded in conventional devices, such as screw extruders (for example twin-screw extruders, TSE), kneaders or Brabender or Banbury mills. After the extrusion, the extrudate can be cooled and comminuted. Individual components can also be premixed and the remaining starting substances can then be added individually and/or likewise as a mixture.

The bringing together and thorough mixing of a premix in the melt can also be carried out in the plasticizing unit of an injection moulding machine. In this procedure, the melt is converted directly into a shaped body in the subsequent step.

The production of the shaped parts of plastic can preferably be carried out by injection moulding.

The use of the plastics compositions according to the invention for the production of multi-layer systems is also of interest. In this, the plastics composition according to the invention is applied in one or more layer(s) to a shaped object made of a plastic. The application can be effected at the same time as or immediately after the shaping of the shaped body, for example by insert moulding of a film, coextrusion or multi-component injection moulding. However, the application can also be effected on the ready-formed base body, e.g. by lamination with a film, injection moulding around an existing shaped body or by coating from a solution.

The present invention furthermore relates to the use of rubber-free anhydride-modified alpha-olefin terpolymers according to component C) for increasing the impact strength of polycarbonate compositions which simultaneously have a combination of high rigidity, good thermal and rheological properties and a flame resistance of UL94 V0 to a minimum of 1.0 mm wall thickness, and to the compositions themselves.

EXAMPLES

Component A

Linear polycarbonate based on bisphenol A having an MVR of 15 (according to ISO 1133, at 300° C. under a 1.2 kg load).

Component B

Potassium perfluoro-1-butanesulfonate commercially obtainable as Bayowet® C4 from Lanxess, Leverkusen, Germany, CAS no. 29420-49-3.

Component C

Ethylene/propylene/octene/maleic anhydride copolymer (ethylene:propylene:octene 87:6:7), CAS no. 31069-12-2, of molecular weight Mw 5,000 g/mol, density 940 kg/m$^3$, acid number 60 mg of KOH/g, maleic anhydride content 4.4%, based on the copolymer C.

Component D-1

CS 7968, cut short glass fibres (binding) from Lanxess AG having an average fibre diameter of 11 µm and an average fibre length of 4.5 mm.

Component D-2

CS108F-14P, cut short glass fibres (non-binding) from 3B having an average fibre diameter of 14 μm and an average fibre length of 4.0 mm.

Component E

Pentaerythritol tetrastearate as a lubricant/mould release agent

Component F

Polytetrafluoroethylene (Blendex® B449 (approx. 50 PTFE and approx. 50% SAN [of 80% styrene and 20% acrylonitrile] from Chemtura).

The Charpy impact strength was measured in accordance with ISO 179/1eU on test bars, injection moulded on one side, of dimensions 80×10×4 mm at RT and −−40° C.

The Vicat B/50, as a measure of the heat distortion point, is determined in accordance with ISO 306 on test specimens of dimensions 80×10×4 mm with a plunger load of 50 N and a heating up rate of 50° C./h.

The average particle size $d_{50}$ is the diameter above and below which in each case 50 wt. % of the particles lie.

The maximum particle size $d_{95}$ is the diameter below which 95 wt. % of the particles lie.

The corresponding diameters were determined by air separation.

The burning properties are measured in accordance with UL 94V on bars of dimensions 127×12.7×1.0 mm, 127×12.7×1.2 mm, 127×12.7×1.5 mm.

The E modulus and the elongation at break were measured in accordance with ISO 527 on shoulder bars injection moulded on one side and having a core of dimensions 80×10×4 mm.

The melt volume rate (MVR) is determined in accordance with ISO 1133 (at 300° C.; 1.2 kg).

The characteristic values of the penetration experiment are determined at −20° C. in accordance with ISO 6603-2 on test sheets of 60 mm×60 mm×2 mm.

| Example | 1 (comp.) | 2 | 3 (comp.) | 4 |
| --- | --- | --- | --- | --- |
| A wt. % | 92.2 | 91.7 | 92.2 | 91.7 |
| B wt. % | 0.2 | 0.2 | 0.2 | 0.2 |
| C wt. % | | 0.5 | | 0.5 |
| D-1 wt. % | | | 7.0 | 7.0 |
| D-2 wt. % | 7.0 | 7.0 | | |
| E wt. % | 0.3 | 0.3 | 0.3 | 0.3 |
| F wt. % | 0.3 | 0.3 | 0.3 | 0.3 |
| MVR [cm³/10 min] | 15.80 | 14.30 | 16.50 | 13.90 |
| VICAT | 145.4 | 144.9 | 146.8 | 146 |
| Charpy impact strength RT kJ/mm² | 161 | 178 | 95 | 114 |
| Charpy impact strength −40° C. kJ/mm² | 90 | 104 | 59 | 80 |
| E modulus [N/mm²] | 3,156 | 3,344 | 3,215 | 3,158 |
| Penetration −20° C. | | | | |
| Maximum force FM [N] | 4,032 | 4,189 | 3,060 | 4,110 |
| Deformation at FM [mm] | 10.5 | 10.9 | 7.4 | 10.2 |
| Energy at FM [J] | 17.2 | 18.9 | 8 | 17.3 |
| Total energy [J] | 19 | 20.9 | 9.2 | 19.2 |
| Total deformation [mm] | 11 | 11.5 | 8 | 10.8 |
| UL 94 V 1.0 mm rating | V0 | V0 | V0 | V0 |
| UL 94 V 1.2 mm rating | V0 | V0 | V0 | V0 |
| UL 94 V 1.5 mm rating | V0 | V0 | V0 | V0 |

The invention claimed is:

1. A flame-resistant, thermoplastic moulding composition comprising:
   A) 41.500 to 94.749 parts by wt. of at least one aromatic polycarbonate,
   B) 0.001 to 1.000 part by wt. of at least one flameproofing agent selected from the group consisting of alkali metal and alkaline earth metal salts of aliphatic or aromatic sulfonic acid, sulfonamides and sulfonimide derivatives,
   C) 0.20 to 1.50 parts by wt. of at least one rubber-free anhydride-modified alpha-olefin terpolymer,
   D) 5.0 to 40.0 parts by wt. of at least one glass fibre,
   E) 0.00 part by wt. to 1.00 part by wt. of at least one mould release agent,
   F) 0.05 part by wt. to 5.00 parts by wt. of at least one antidripping agent,
   G) 0.0-10.0 parts by wt. of a further additive selected from the group consisting of antioxidants, heat stabilizers, optical brighteners and light-scattering agents,
   wherein the sum of the parts by weight of components A) to G) adds up to 100 parts by weight.

2. The moulding composition according to claim 1, wherein the composition comprises component D) in an amount of from 7.0 to 20.0 parts by wt.

3. The moulding composition according to claim 1, wherein the composition comprises component G) in an amount of from 0.20 to 3.0 parts by wt.

4. The moulding composition according to claim 1, wherein the composition comprises component C) in an amount of from 0.40 to 0.60 parts by wt.

5. The moulding composition according to claim 1, wherein the anhydride is selected from the group consisting of maleic anhydride, phthalic anhydride, fumaric anhydride, itaconic anhydride and mixtures thereof.

6. The moulding composition according to claim 5, wherein the anhydride is maleic anhydride.

7. The moulding composition according to claim 5, wherein the alpha-olefin terpolymer comprises units selected from the group consisting of ethylene, 1-propene, 1-butene, 1-isobutene, 1-pentene, 1-hexene, 1-heptene, 1-octene, 1-nonene, 1-decene, 1-undecene, 1-dodecene, 1-tridecene, 1-tetradecene, 1-octadecene, 1-nonadecene and mixtures thereof.

8. The moulding composition according to claim 5, wherein the at least one rubber-free anhydride-modified terpolymer comprises
   E1) 90.0-98.0 wt. % of terpolymer and
   E2) 2.0-10.0 wt. % of anhydride.

9. The moulding composition according to claim 1, wherein the terpolymer consists of units of ethylene, 1-propene and 1-octene.

10. The moulding composition according to claim 8, wherein the olefinic part E1) of the anhydride-modified terpolymer is characterized in that
   the ethylene content is 96.0-80.0 wt. %;
   the propylene content is 2.0-10.0 wt. %; and
   the octene content is 2.0-10.0 wt. %.

11. The moulding composition according to claim 1, wherein the at least one rubber-free anhydride-modified terpolymer has a molecular weight Mw of 2,000-10,000 g/mol.

12. The moulding composition according to claim 1, wherein the at least one glass fibre is a cut glass fibre.

13. The moulding composition according to claim 12, wherein the at least one cut glass fibre is produced from E- or C-glass and has a fibre diameter of from 5 to 25 μm.

14. The moulding composition according to claim 1, wherein the at least one flameproofing agent is selected from the group consisting of sodium and potassium perfluorobutane-sulfate, sodium and potassium perfluorooctane-sulfate, sodium and potassium diphenyl sulfone-sulfonate, sodium and potassium 2,4,6-trichlorobenzoate, N-(p-tolylsulfonyl)-p-toluenesulfimide potassium salt and N—(N'-benzylaminocarbonyl)-sulfanylimide potassium salt.

15. A method for the production of a thin-walled housing part or a switch box comprising utilizing the moulding composition according to claim 1, wherein the thin-walled housing part or the switch box has a flameproofing of UL94 V0 at a minimum of 1 mm wall thickness and an impact strength of at least 110 kJ/mm$^2$ at room temperature (RT) according to ISO 179/1eU.

16. The moulding composition according to claim 13, wherein the at least one cut glass fibre has a length before compounding of from 3 mm to 6 mm.

* * * * *